(12) United States Patent
Joseph et al.

(10) Patent No.: US 12,446,949 B2
(45) Date of Patent: Oct. 21, 2025

(54) SYSTEM AND USER INTERFACE FOR DISPLAYING ACTUAL OPERATING PARAMETERS AND IDEAL OPERATING PARAMETERS

(71) Applicant: Covidien LP, Mansfield, MA (US)

(72) Inventors: Daniel A. Joseph, Golden, CO (US); Jennifer R. McHenry, Denver, CO (US)

(73) Assignee: Covidien LP, Mansfield, MA (US)

(*) Notice: Subject to any disclaimer, the term of this patent is extended or adjusted under 35 U.S.C. 154(b) by 1268 days.

(21) Appl. No.: 17/190,682

(22) Filed: Mar. 3, 2021

(65) Prior Publication Data

US 2021/0369328 A1 Dec. 2, 2021

Related U.S. Application Data

(60) Provisional application No. 63/033,270, filed on Jun. 2, 2020.

(51) Int. Cl.
*A61B 18/14* (2006.01)
*A61B 18/12* (2006.01)
*A61B 90/00* (2016.01)
*A61B 18/00* (2006.01)

(52) U.S. Cl.
CPC ...... *A61B 18/1445* (2013.01); *A61B 18/1206* (2013.01); *A61B 90/06* (2016.02); *A61B 2018/00898* (2013.01); *A61B 2090/066* (2016.02)

(58) Field of Classification Search
None
See application file for complete search history.

(56) References Cited

U.S. PATENT DOCUMENTS

| | | |
|---|---|---|
| 8,795,195 B2 | 8/2014 | Daw et al. |
| 9,718,190 B2 | 8/2017 | Arkin et al. |
| 9,924,961 B2 | 3/2018 | Shelton, IV et al. |
| 10,194,992 B2 | 2/2019 | Robinson |
| 10,357,247 B2 | 7/2019 | Shelton, IV et al. |
| 2004/0158132 A1* | 8/2004 | Zaleski ............. A61B 5/02028 128/920 |
| 2005/0234445 A1* | 10/2005 | Conquergood ...... A61B 18/148 606/41 |
| 2019/0038346 A1* | 2/2019 | Panescu ................. A61B 34/20 |
| 2019/0201022 A1* | 7/2019 | Schoettgen ............ A61B 17/29 |

* cited by examiner

*Primary Examiner* — Linda C Dvorak
*Assistant Examiner* — Ryan T Clark

(57) ABSTRACT

A surgical system and a computing device for a surgical system that is configured to calculate actual operating parameters of an electrosurgical instrument, including an actual angle between the jaw members of the electrosurgical instrument, and to display a user interface. The user interface includes an ideal angle range between the jaw members and the actual angle between the jaw members of the electrosurgical instrument relative to the ideal angle range. The computing device is further configured to determine if the actual angle between the jaw members of the electrosurgical instrument is outside the ideal angle range.

18 Claims, 3 Drawing Sheets

SYSTEM AND USER INTERFACE FOR DISPLAYING ACTUAL OPERATING PARAMETERS AND IDEAL OPERATING PARAMETERS

CROSS REFERENCE TO RELATED APPLICATION

This application claims the benefit of the filing date of provisional U.S. Application No. 63/033,270, filed on Jun. 2, 2020.

FIELD

The present disclosure relates generally to electrosurgical systems and instruments. In particular, the disclosure relates to an electrosurgical system and user interfaces that display actual operating parameters of an electrosurgical instrument relative to ideal operating parameters.

BACKGROUND

Electrosurgical forceps are commonly used in open and endoscopic surgical procedures to coagulate, cauterize and seal tissue. Such forceps typically include a housing and a pair of jaws disposed on a distal portion of an elongated member extending from the housing. The pair of jaws can be controlled by a surgeon to grasp targeted tissue, such as, e.g., a blood vessel. The jaws may be approximated to apply a mechanical clamping force to the tissue, and are associated with at least one electrode to permit the delivery of electrosurgical energy to the tissue. The combination of the mechanical clamping force and the electrosurgical energy has been demonstrated to join adjacent layers of tissue captured between the jaws. When the adjacent layers of tissue include the walls of a blood vessel, sealing the tissue may result in hemostasis, which may facilitate the transection of the sealed tissue.

SUMMARY

The present disclosure relates generally to electrosurgical systems and instruments. In particular, the disclosure relates to an electrosurgical system and user interfaces that display actual operating parameters of an electrosurgical instrument relative to ideal operating parameters.

According to an aspect of the disclosure, a surgical system includes an electrosurgical generator, an electrosurgical instrument configured to operably couple to the electrosurgical generator, and a computing device operably coupled to the electrosurgical instrument and the electrosurgical generator. The electrosurgical instrument includes a housing, an elongated member extending distally from the housing, and an end effector assembly coupled to a distal portion of the elongated member. The end effector assembly includes a pair of opposing jaw members, with at least one of the jaw members moveable relative to the other to grasp tissue therebetween and at least one of the jaw members adapted to connect to the electrosurgical generator for conducting electrosurgical energy through grasped tissue. The computing device is configured to calculate an actual angle between the jaw members of the electrosurgical instrument and display a user interface. The user interface includes an ideal angle range between the jaw members and the actual angle between the jaw members of the electrosurgical instrument relative to the ideal angle range.

In an aspect, the computing device is further configured to determine if the actual angle between the jaw members of the electrosurgical instrument is outside the ideal angle range. The computing device is further configured to generate at least one of an audible, visible, or tactile alert when it is determined that the actual angle between the jaw members of the electrosurgical instrument is outside the ideal angle range. Additionally, or alternatively, the computing device is further configured to control an output of the electrosurgical generator when it is determined that the actual angle between the jaw members of the electrosurgical instrument is outside the ideal angle range.

In an aspect, the actual angle between the jaw members is displayed in a first color when the actual angle between the jaw members of the electrosurgical instrument is within the ideal angle range and the actual angle between the jaw members is displayed in a second color, different from the first color, when the actual angle between the jaw members of the electrosurgical instrument is outside the ideal angle range.

In an aspect, the electrosurgical instrument includes an angle sensor operably coupled to the end effector assembly and configured to sense the actual angle between the jaw members. Additionally, or alternatively, the electrosurgical instrument includes a force sensor operably coupled to the end effector assembly and configured to sense an actual tip force against the end effector assembly. The electrosurgical instrument may also include a torque sensor operably coupled to the elongated member and configured to sense an actual torsional force against the elongated member.

In an aspect, the user interface includes an ideal tip force range against the end effector assembly and an actual tip force against the end effector assembly relative to the ideal tip force range. The user interface may also include an arrow representing a direction of the actual tip force against the end effector assembly.

In an aspect, the user interface includes an ideal torsional force range against the elongated member and an actual torsional force against the elongated member relative to the ideal torsional force range.

In another aspect of the disclosure, an electrosurgical generator includes a processor and a memory storing instructions which, when executed by the processor, cause the processor to calculate actual operating parameters of an electrosurgical instrument including an actual angle between two jaw members of an end effector assembly of the electrosurgical instrument, determine if the actual angle between the jaw members of the electrosurgical instrument is outside an ideal angle range, and display a user interface. The user interface includes the ideal angle range between the jaw members and the actual angle between the jaw members of the electrosurgical instrument relative to the ideal angle range. The actual angle between the jaw members is displayed in a first color when the actual angle between the jaw members of the electrosurgical instrument is within the ideal angle range and the actual angle between the jaw members is displayed in a second color, different from the first color, when the actual angle between the jaw members of the electrosurgical instrument is outside the ideal angle range.

In an aspect, the instructions, when executed by the processor, cause the processor to generate at least one of an audible, visible, or tactile alert when it is determined that the actual angle between the jaw members of the electrosurgical instrument is outside the ideal angle range.

In an aspect, the instructions, when executed by the processor, cause the processor to control an output of the electrosurgical generator when it is determined that the actual angle between the jaw members of the electrosurgical instrument is outside the ideal angle range.

In an aspect, the actual operating parameters further include an actual tip force against the end effector assembly and the user interface includes an ideal tip force range against the end effector assembly and the actual tip force against the end effector assembly relative to the ideal tip force range.

In an aspect, the instructions, when executed by the processor, cause the processor to determine if the actual tip force is outside the ideal tip force range. The actual tip force against the end effector assembly is displayed in the first color when the actual tip force against the end effector assembly is within the ideal tip force range and the actual tip force against the end effector assembly is displayed in the second color when the actual tip force against the end effector assembly is outside the ideal tip force range.

In an aspect, the actual operating parameters further include an actual torsional force against an elongated member of the electrosurgical instrument and the user interface includes an ideal torsional force range against the elongated member and an actual torsional force against the elongated member relative to the ideal torsional force range.

In an aspect, the instructions, when executed by the processor, cause the processor to determine if the actual torsional force is outside the ideal torsional force range. The actual torsional force against the elongated member is displayed in the first color when the actual torsional force against the elongated member is within the ideal torsional force range and the actual torsional force against the elongated member is displayed in the second color when the actual torsional force against the elongated member is outside the ideal torsional force range.

In another aspect of the disclosure a user interface includes an ideal angle range between two jaw members of an end effector assembly of an electrosurgical instrument, an actual angle between the jaw members of the electrosurgical instrument relative to the ideal angle range, an ideal tip force range against the end effector assembly and the actual tip force against the end effector assembly relative to the ideal tip force range. The actual angle between the jaw members is displayed in a first color when the actual angle between the jaw members of the electrosurgical instrument is within the ideal angle range and the actual angle between the jaw members is displayed in a second color, different from the first color, when the actual angle between the jaw members of the electrosurgical instrument is outside the ideal angle range. The actual tip force against the end effector assembly is displayed in the first color when the actual tip force against the end effector assembly is within the ideal tip force range and the actual tip force against the end effector assembly is displayed in the second color when the actual tip force against the end effector assembly is outside the ideal tip force range.

In an aspect, the user interface further includes an ideal torsional force range against an elongated member of the electrosurgical instrument and an actual torsional force against the elongated member relative to the ideal torsional force range. The actual torsional force against the elongated member is displayed in the first color when the actual torsional force against the elongated member is within the ideal torsional force range and the actual torsional force against the elongated member is displayed in the second color when the actual torsional force against the elongated member is outside the ideal torsional force range.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

The accompanying drawings, which are incorporated in and constitute a part of this specification, illustrate embodiments of the present disclosure and, together with the detailed description given below, serve to explain the principles of the disclosure.

DETAILED DESCRIPTION

Figures 1A, 1B:
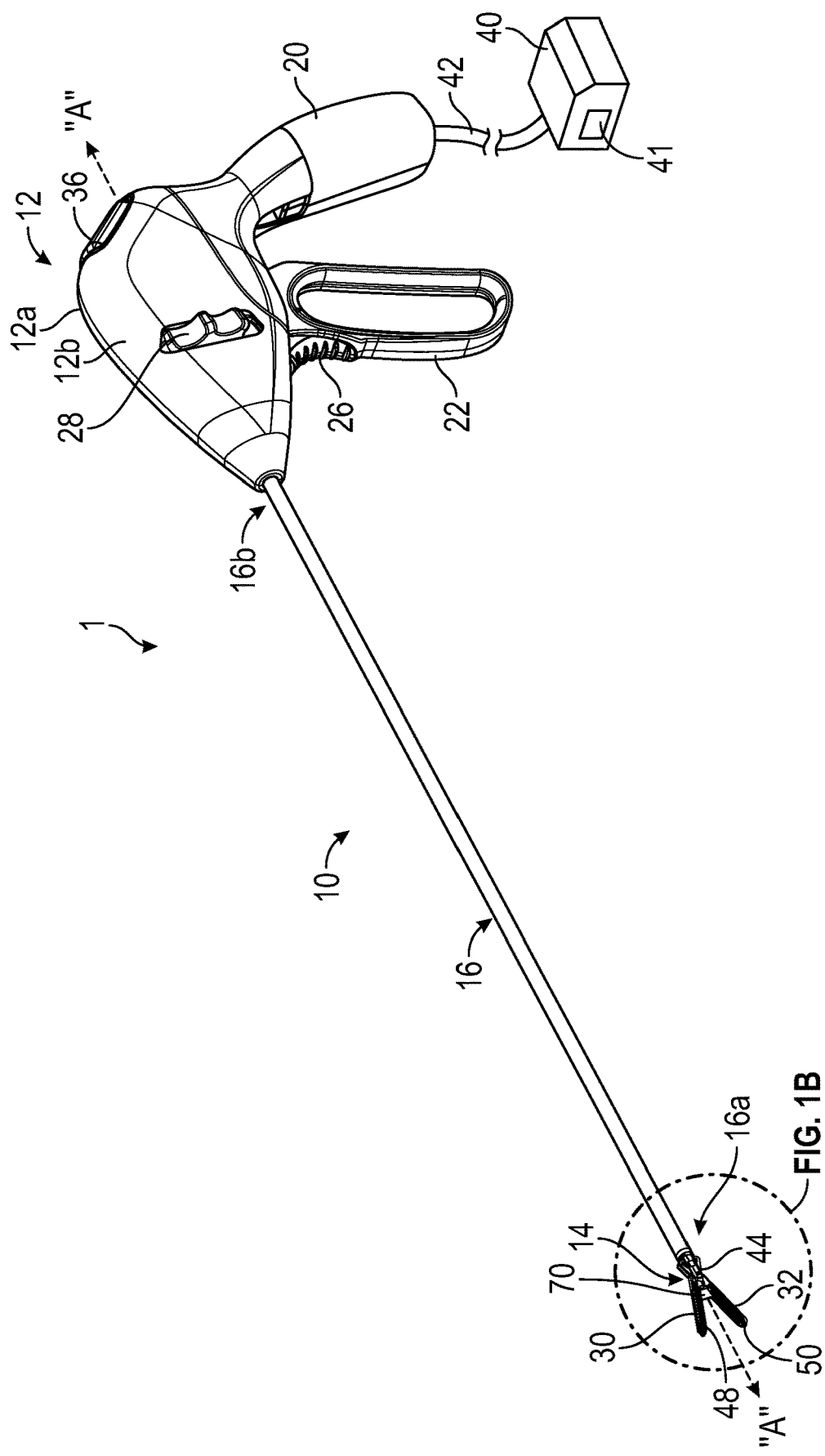
FIG. 1A is a system view of an electrosurgical system including an electrosurgical instrument and an electrosurgical generator in accordance with the disclosure.
FIG. 1B is an enlarged perspective view of an end effector assembly of the electrosurgical instrument of FIG. 1A.
Figure 1B:
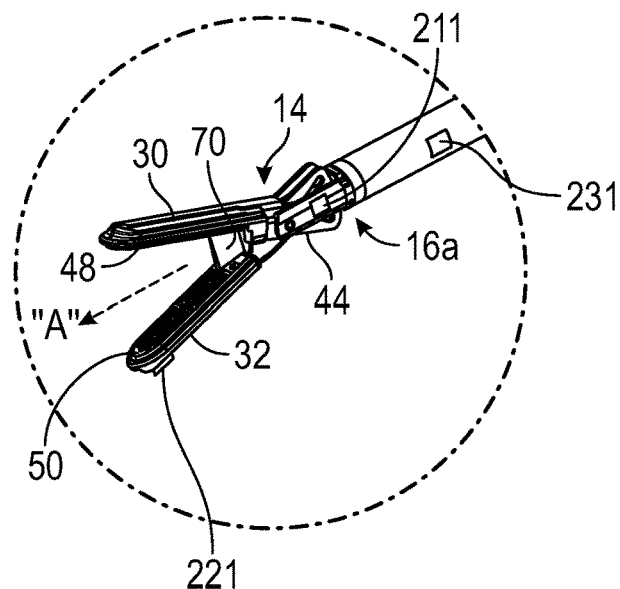

Embodiments of the presently disclosed surgical system, instruments, and methods will now be described in detail with reference to the drawings, in which like reference numerals designate identical or corresponding elements in each of the several views. As used herein, the term "distal" refers to that portion of the surgical instrument or components thereof, farther from the user, while the term "proximal" refers to that portion of the surgical instrument or components thereof, closer to the user.

The present disclosure relates to real time display of the operating parameters for any controlled surgical instrument for graphically comparing to the ideal operating parameter to allow the clinician to actively refine the physical parameter to a more ideal state. The data may also be logged, and user interfaces are provided to play a seal cycle back on the same time scale for subsequent review and analysis.

As described in detail below, the screen of a generator or another separate device may include a graphic display to show jaw aperture (e.g, angle the jaws are open for this case assume 10 degrees and below are good and above are bad) on a graph where the angle from 0 to 10 degrees are associated with the color green, and angles above 10 degrees are associated with the color red. The display device will display green when the actual aperture of the jaws is within ideal parameters (e.g., predetermined parameters for vessel sealing) and will display red when the actual aperture of the jaws is not within the ideal parameters. This will allow the clinician to see the parameters of this specific device and procedure for ensuring the best procedural outcome (e.g., the best seal quality). This graphical feedback can be quantitatively not just green—red to allow the clinician to see the true ideal sealing parameters. This same feedback can occur as the seal cycle is occurring. Also, other parameters that impact seal quality can be judged on how they affect the ideal seal cycle for example, wet or dry sealing fields, tension on the vessel, tissue deep in jaw vs. at the tip, and tissue type.

Referring initially to FIGS. 1A and 1B, an electrosurgical system 1 includes an electrosurgical generator 40 and an electrosurgical instrument 10 configured to operably couple to the electrosurgical generator 40. The electrosurgical instrument 10 generally includes a housing 12 coupled to a proximal portion 16b of an elongated member 16. The housing 12 supports various actuators for remotely controlling an end effector assembly 14 coupled to a distal portion 16a of the elongated member 16. The end effector assembly 14 includes a pair of opposing jaw members 30, 32 mechanically coupled to the elongated member 16 about a pivot 44. Although this configuration is typically associated with instruments for use in laparoscopic or endoscopic surgical procedures, various aspects of the present disclosure may be practiced with traditional open instruments and in connection with endoluminal procedures as well.

The housing 12 is constructed of a right housing half 12a and a left housing half 12b. The left and right designation of the housing halves 12a, 12b refer to the respective directions as perceived by an operator using the electrosurgical instrument 10. The housing halves 12a, 12b may be constructed of sturdy plastic, and may be joined to one another by adhesives, ultrasonic welding or other suitable assembly methods.

To mechanically control the end effector assembly 14, the housing 12 supports a stationary handle 20, a movable handle 22, and a rotation knob 28. The movable handle 22 is movable relative to the stationary handle 20 to move the end effector assembly 14 between an open configuration (FIGS. 1A and 1B) wherein the jaw members 30, 32 are disposed in spaced relation relative to one another, and a closed configuration (not shown) wherein the jaw members 30, 32 are approximated.

A trigger 26 is supported by the housing 12 and is operable to extend and retract a knife 70 (FIGS. 1A and 1B) through the end effector assembly 14 when the end effector assembly 14 is in the closed configuration. The rotation knob 28 serves to rotate the elongated member 16 and the end effector assembly 14 about a longitudinal axis "A-A" defined by the elongated member 16.

To electrically control the end effector assembly 14, the housing 12 supports a switch 36 thereon, which is operable by the user to initiate and terminate the delivery of electrosurgical energy to the end effector assembly 14. The switch 36 is in electrical communication with an electrosurgical energy source, such as, for example, electrosurgical generator 40 or a battery (not shown) supported within the housing 12. The electrosurgical generator 40 may include devices such as the LIGASURE® Vessel Sealing Generator and the Force Triad® Generator as sold by Covidien LP, a division of Medtronic. A cable 42 extends from the housing 12 to the electrosurgical generator 40 to electrically couple the end effector assembly 14 to the electrosurgical generator 40. More specifically, the jaw members 30, 32 are electrically coupled to the electrosurgical generator 40 (e.g., via suitable wiring extending through the elongated member 16 and the housing 12) to provide an electrical pathway to a pair of electrically conductive, tissue sealing surfaces 48, 50 disposed on the jaw members 30, 32, respectively. Sealing surfaces 48 and 50 may be electrically coupled to terminals of opposite polarity, e.g., positive (+) and negative (−), associated with the electrosurgical generator 40 to deliver bipolar energy to tissue grasped between jaw members 30, 32. Alternatively, the sealing surfaces 48 and 50 may be configured to deliver monopolar energy to tissue. In a monopolar configuration, one or both sealing surfaces 48 and 50 deliver electrosurgical energy from a positive (+) terminal and a return pad (not shown) is placed on a patient to provide a return path to the negative (−) terminal.

Electrosurgical energy may be delivered to tissue clasped between the jaw members 30, 32 through the sealing surfaces 48, 50 to effect a tissue seal. Gap and pressure between the jaw members 30, 32 may need to be controlled to ensure an accurate and consistent seal. Once a tissue seal is established, the knife 70 may be advanced distally to transect the sealed tissue. The knife 70 is depicted in FIGS. 1A and 1B as extending from the elongated member 16 while the end effector assembly 14 is in an open configuration. In some embodiments, a mechanism (not shown) may be provided to prevent advancement of the knife 70 through the jaw members 30, 32 when the end effector assembly 14 is in the open configuration.

Figure 2:
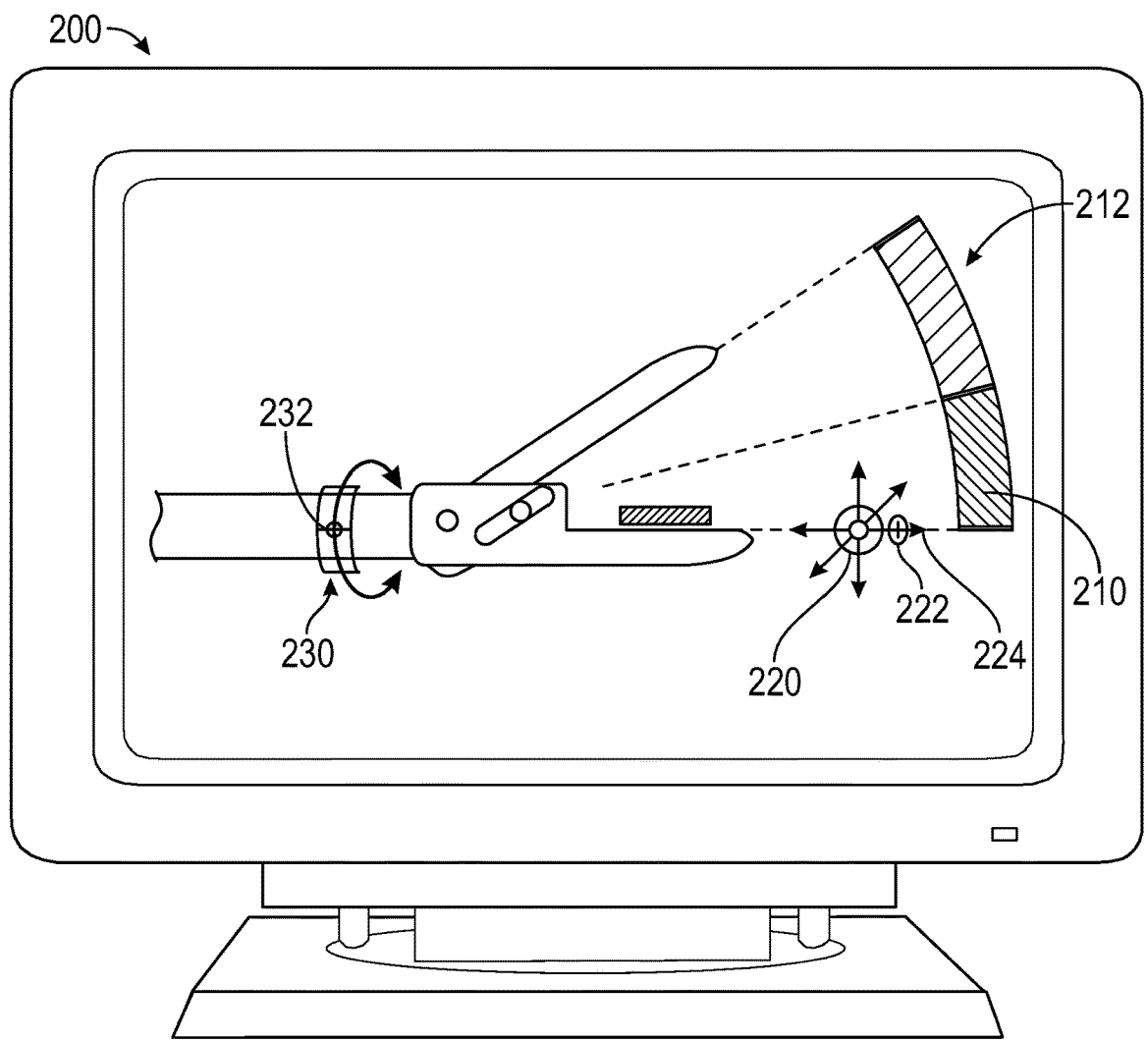
FIG. 2 is a user interface displayable on the electrosurgical generator of FIG. 1A in accordance with the disclosure.
Figure 3:
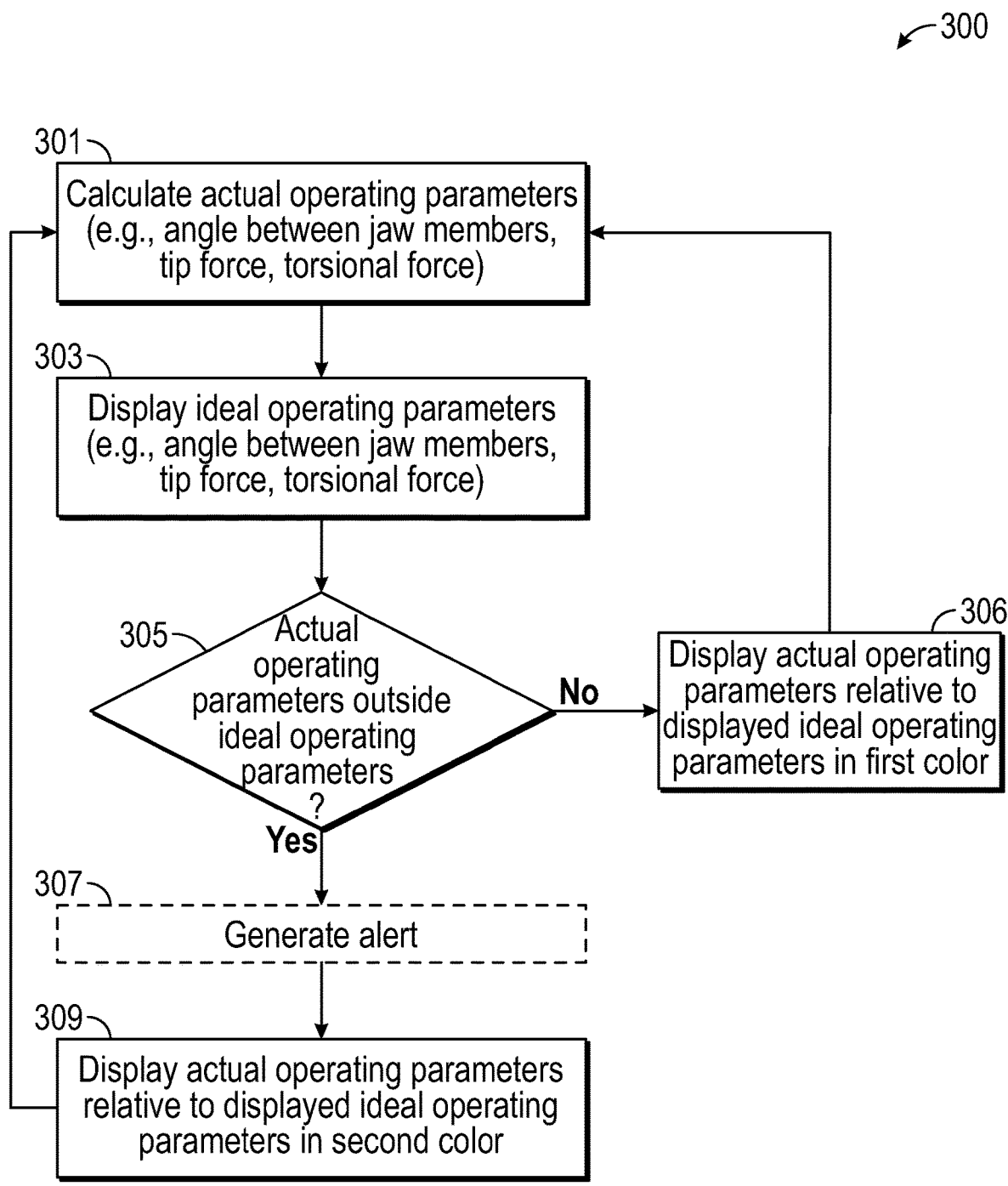
FIG. 3 is a flowchart of a method for displaying actual operating parameters relative to ideal operating parameters in accordance with the disclosure.

The electrosurgical generator 40 includes a computing device 41, processors, and memory devices that store instructions, which when executed by the processors cause any of the computing device 41, the electrosurgical generator 40 or its processors to perform a series of steps (e.g., steps of method 300 of FIG. 3). The computing device 41 may be a component of the electrosurgical generator 40 or may be a separate component from the electrosurgical generator 40. The computing device 41 includes a display for displaying graphical user interfaces (e.g., user interface 200 of FIG. 2) which assist the clinician during surgical procedures.

With additional reference to FIG. 2, the computing device 41 calculates actual operating parameters of the electrosurgical instrument 10 including an actual angle between the jaw members 30, 32 of the electrosurgical instrument 10 and displays the user interface 200 which includes angle-relevant data. The actual angle between the jaw members 30, 32 may be calculated by signals provided by an angle sensor 211 operably coupled to the end effector assembly 14. User interface 200 includes a display of an ideal angle range 210 between the jaw members 30, 32 and the actual angle 212 between the jaw members 30, 32 of the electrosurgical instrument 10 relative to the ideal angle range 210. Displaying the actual angle 212 relative to the ideal angle range 210 provides the clinician with a simple visual aid in determining whether the actual angle 212 is too large for performing a safe and effective tissue seal.

To further aid the clinician with this visualization, the computing device 41 determines if the actual angle 212 between the jaw members 30, 32 of the electrosurgical instrument 10 is outside the ideal angle range 210 (e.g., greater than an acceptable threshold angle) and generates at least one of an audible, visible, or tactile alert when it is determined that the actual angle 212 between the jaw members 30, 32 of the electrosurgical instrument 10 is outside the ideal angle range 210. Such an alert notifies the clinician that the electrosurgical generator 40 should not yet be activated, and that if activation were to be initiated, then the risk of premature cooking of the tissue exists. Additionally, the actual angle 212 between the jaw members 30, 32 is displayed in a first color when the actual angle 212 between the jaw members 30, 32 of the electrosurgical instrument 10 is within the ideal angle range 210. On the other hand, the actual angle 212 between the jaw members 30, 32 is displayed in a second color, different from the first color, when the actual angle 212 between the jaw members 30, 32 of the electrosurgical instrument 10 is outside the ideal angle range 210. In an aspect, in addition to, or in place of, providing the clinician with an alert, and/or adjusting the color of the actual angle 212, when the actual angle 212 is outside of an ideal or otherwise acceptable range, the computing device 41 may control an output of the electrosurgical generator 40 (e.g., prevent power activation, cut-off power delivery, or adjust power output).

The computing device 41 also calculates an actual tip force against the end effector assembly 14. The actual tip force against the end effector assembly 14 may be calculated by signals provided by a force sensor 221 operably coupled to the end effector assembly 14. User interface 200 includes a display of an ideal tip force range 220 against the end effector assembly 14 and an actual tip force 222 against the end effector assembly 14 relative to the ideal tip force range 220. Displaying the actual tip force 222 relative to the ideal tip force range 220 provides the clinician with a simple visual aid in determining whether any forces (e.g., external forces) pressing against the end effector assembly 14 are too large for performing a safe and effective tissue seal. User interface 200 also includes an arrow 224 representing a direction of the force imparted upon the end effector assembly 14 to provide additional insight for the clinician.

The actual tip force 222 against the end effector assembly 14 is displayed in the first color when the actual tip force 222 against the end effector assembly 14 is within the ideal tip force range 220 (e.g., the actual force imparted on the end effector assembly 14 does not exceed a threshold distances from a center point). On the other hand, the actual tip force 222 against the end effector assembly 14 is displayed in the second color when the actual tip force 222 against the end effector assembly 14 is outside the ideal tip force range 220. In an aspect, in addition to, or in place of, providing the clinician with an alert, and/or adjusting the color of the actual tip force 222, when the actual tip force 222 is outside of an ideal or otherwise acceptable range, the computing device 41 may control an output of the electrosurgical generator 40 (e.g., prevent power activation, cut-off power delivery, or adjust power output) and/or provide other audible, visual, or tactile alerts.

The computing device 41 also calculates an actual torsional force against the elongated member 16. The actual torsional force against the elongated member 16 may be calculated by signals provided by a torque sensor 231 operably coupled to the end effector assembly 14 or the elongated member 16. User interface 200 includes a display of an ideal torsional force range 230 against the elongated member 16 and an actual torsional force 232 against the elongated member 16 relative to the ideal torsional force range 230. Displaying the actual torsional force 232 relative to the ideal torsional force range 230 provides the clinician with a simple visual aid in determining whether any forces (e.g., external forces) pressing against the end effector assembly 14 or elongated member 16 are too large for performing a safe and effective tissue seal.

The actual torsional force 232 against the end effector assembly 14 and/or elongated member 16 is displayed in the first color when the actual torsional force 232 against the end effector assembly 14 or elongated member 16 is within the ideal torsional force range 230 (e.g., the actual torsional force imparted on the end effector assembly 14 or elongated member 16 does not exceed a threshold). On the other hand, the actual torsional force 232 against the end effector assembly 14 or elongated member 16 is displayed in the second color when the actual torsional force 232 against the end effector assembly 14 or elongated member 16 is outside the ideal torsional force range 230. In an aspect, in addition to, or in place of, providing the clinician with an alert, and/or adjusting the color of the actual torsional force 232, when the actual torsional force 232 is outside of an ideal or otherwise acceptable range, the computing device 41 may control an output of the electrosurgical generator 40 (e.g., prevent power activation, cut-off power delivery, or adjust power output) and/or provide other audible, visual, or tactile alerts.

FIG. 3 is a flowchart of a method for displaying actual operating parameters relative to ideal operating parameters in accordance with the disclosure and will be described as method 300. Method 300 may be performed by any of the components of system 1, for example, a processor of any of the components including electrosurgical generator 40, computing device 41, and/or electrosurgical instrument 10. The steps of method 300 may be performed in any order and method 300 may include some or all of the steps described. The steps of method 300 may be stored as instructions included in a memory device of any of the components of the system 1 or a removable memory device couplable to any of the components.

Method 300 begins at step 301 where actual operating parameters are calculated. The actual operating parameters may include any of the angle between jaw members 30, 32 of electrosurgical instrument 10, a tip force against the end effector assembly 14 of electrosurgical instrument 10, and/or the torsional force imparted against the end effector assembly 14 or the elongated member 16 of the electrosurgical instrument 10. In step 303, predetermined ideal operating parameters are displayed on a user interface (e.g., user interface 200).

In step 305, it is determined whether the operating parameters calculated in step 301 are outside the predetermined ideal operating parameters. For example, the ideal operating parameters may have a given acceptable range with upper and lower limit thresholds. If the operating parameters calculated in step 301 are outside the ideal operating parameters, for example, if the actual angle between the jaw members 30, 32 exceeds an upper threshold limit, (YES in step 305), then method 300 proceeds to step 307 (optional) and step 309. Alternatively, if the operating parameters calculated in step 301 are not outside the ideal operating parameters, for example, if the actual angle between the jaw members 30, 32 is within upper and lower threshold limits, (NO in step 305), then method 300 proceeds to step 306.

Step 307, which is optional, includes generating an alert for the clinician indicating that the actual operating parameters are outside the ideal operating parameters. Such an alert may be audible, visual, and/or tactile and notifies the clinician that application of electrosurgical energy to the tissue may result in undesired effects and may not complete an ideal tissue seal. This step may also include controlling the electrosurgical generator 40, for example, by increasing or reducing the output of the electrosurgical generator 40, ceasing output of the electrosurgical generator 40, or preventing initiation of output of the electrosurgical generator 40.

In steps 306 and 309, the operating parameters calculated in step 301 are displayed on a user interface (e.g., user interface 200), and the manner in which the operating parameters are displayed depend on whether the calculated operating parameters are within predetermined ideal operating parameters. If the operating parameters calculated in step 301 are not outside the ideal operating parameters, for example, if the actual angle between the jaw members 30, 32 is within upper and lower threshold limits, (NO in step 305), then the operating parameters are displayed in a first color (e.g., green). Alternatively, if the operating parameters calculated in step 301 are outside the ideal operating parameters, for example, if the actual angle between the jaw members 30, 32 is outside upper or lower threshold limits, (YES in step 305), then the operating parameters are displayed in a second color (e.g., red). The degree to which the operating parameter falls outside the ideal operating range may also impact the color in which the operating parameter is displayed. That is, multiple tiered thresholds may be considered, and the actual operating parameter can be displayed in a color corresponding to the tier in which it corresponds. For example, if the predetermined ideal angle between the jaw members 30, 32 is 15 degrees, the user interface 200 may display the actual operating parameter in yellow if the actual angle between the jaw members 30, 32 is 20 degrees, and the user interface 200 may display the actual operating parameter in red if the actual angle between the jaw members 30, 32 is 40 degrees.

Although the examples provided above for method 300 are described as they pertain to angles between jaw member 30, 32 as actual and ideal operating parameters, it is understood that the actual and ideal operating parameters may additionally or alternatively include tip force against the end effector assembly 14 and/or torsional force against the end effector assembly 14 or elongated member 16 of the electrosurgical instrument 10.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as examples of particular embodiments. Those skilled in the art will envision other modifications within the scope and spirit of the claims appended hereto.

The various embodiments disclosed herein may also be configured to work with robotic surgical systems and what is commonly referred to as "Telesurgery." Such systems employ various robotic elements to assist the surgeon in the operating room and allow remote operation (or partial remote operation) of surgical instrumentation. Various robotic arms, gears, cams, pulleys, electric and mechanical motors, etc. may be employed for this purpose and may be designed with a robotic surgical system to assist the surgeon during the course of an operation or treatment. Such robotic systems may include remotely steerable systems, automatically flexible surgical systems, remotely flexible surgical systems, remotely articulating surgical systems, wireless surgical systems, modular or selectively configurable remotely operated surgical systems, etc.

The robotic surgical systems may be employed with one or more consoles that are next to the operating theater or located in a remote location. In this instance, one team of surgeons or nurses may prep the patient for surgery and configure the robotic surgical system with one or more of the instruments disclosed herein while another surgeon (or group of surgeons) remotely control the instruments via the robotic surgical system. As can be appreciated, a highly skilled surgeon may perform multiple operations in multiple locations without leaving his/her remote console which can be both economically advantageous and a benefit to the patient or a series of patients.

The robotic arms of the surgical system are typically coupled to a pair of master handles by a controller. The handles can be moved by the surgeon to produce a corresponding movement of the working ends of any type of surgical instrument (e.g., end effectors, graspers, knifes, scissors, etc.) which may complement the use of one or more of the embodiments described herein. The movement of the master handles may be scaled so that the working ends have a corresponding movement that is different, smaller or larger, than the movement performed by the operating hands of the surgeon. The scale factor or gearing ratio may be adjustable so that the operator can control the resolution of the working ends of the surgical instrument(s).

The master handles may include various sensors to provide feedback to the surgeon relating to various tissue parameters or conditions, e.g., tissue resistance due to manipulation, cutting or otherwise treating, pressure by the instrument onto the tissue, tissue temperature, tissue impedance, etc. As can be appreciated, such sensors provide the surgeon with enhanced tactile feedback simulating actual operating conditions. The master handles may also include a variety of different actuators for delicate tissue manipulation or treatment further enhancing the surgeon's ability to mimic actual operating conditions.

Although the foregoing disclosure has been described in some detail by way of illustration and example, for purposes of clarity or understanding, it will be obvious that certain changes and modifications may be practiced within the scope of the appended claims.

What is claimed is:

1. A surgical system, comprising:
an electrosurgical generator configured to generate electrosurgical energy;
an electrosurgical instrument configured to operably couple to the electrosurgical generator, the electrosurgical instrument including:
a housing;
an elongated member extending distally from the housing; and
an end effector assembly operably coupled to a distal portion of the elongated member, the end effector assembly including a pair of opposing jaw members, at least one of the jaw members moveable relative to the other to grasp tissue therebetween, at least one of the jaw members adapted to connect to the electrosurgical generator for conducting electrosurgical energy through grasped tissue; and
a computing device operably coupled to the electrosurgical instrument, the computing device configured to:
calculate an actual angle between the jaw members of the electrosurgical instrument; and
display a user interface including:
a representation of the jaw members of the end effector assembly defining an angle therebetween;
an ideal angle range between the jaw members, the ideal angle range displayed as a first portion of the angle defined between the jaw members of the representation, the first portion marked;
the actual angle between the jaw members, the actual angle displayed relative to the ideal angle range as a second portion of the angle defined between the jaw members of the representation; and
a difference between the actual angle and the ideal angle displayed as a third portion of the angle defined between the jaw members, there being a demarcation between the third portion and the second portion.

2. The surgical system of claim 1, wherein the computing device is further configured to determine if the actual angle between the jaw members of the electrosurgical instrument is outside the ideal angle range.

3. The surgical system of claim 2, wherein the computing device is further configured to generate at least one of an audible, visible, or tactile alert when it is determined that the actual angle between the jaw members of the electrosurgical instrument is outside the ideal angle range.

4. The surgical system of claim 2, wherein the computing device is further configured to control an output of the electrosurgical generator when it is determined that the actual angle between the jaw members of the electrosurgical instrument is outside the ideal angle range.

5. The surgical system of claim 2, wherein:
the actual angle between the jaw members is displayed in a first color when the actual angle between the jaw members of the electrosurgical instrument is within the ideal angle range; and
the actual angle between the jaw members is displayed in a second color, different from the first color, when the actual angle between the jaw members of the electrosurgical instrument is outside the ideal angle range.

6. The surgical system of claim 1, wherein the electrosurgical instrument includes an angle sensor operably coupled to the end effector assembly and configured to sense the actual angle between the jaw members.

7. The surgical system of claim 1, wherein the electrosurgical instrument includes a force sensor operably coupled to the end effector assembly and configured to sense an actual external force against the end effector assembly.

8. The surgical system of claim 1, wherein the user interface includes:
an ideal external force range against the end effector assembly; and
an actual external force against the end effector assembly relative to the ideal external force range.

9. The surgical system of claim 8, wherein the user interface includes an arrow representing a direction of the actual external force against the end effector assembly.

10. The surgical system of claim 1, wherein the electrosurgical instrument includes a torque sensor operably coupled to the elongated member and configured to sense an actual external torsional force against the elongated member.

11. The surgical system of claim 1, wherein the user interface includes:
an ideal external torsional force range against the elongated member; and
an actual external torsional force against the elongated member relative to the ideal external torsional force range.

12. An electrosurgical generator including a processor and a memory storing instructions which, when executed by the processor, cause the processor to:
calculate actual operating parameters of an electrosurgical instrument including an external force applied against at least one of an end effector assembly of the electrosurgical instrument or an elongated member of the electrosurgical instrument that supports the end effector assembly;
determine if an actual external force applied against the at least one of the jaw members or the elongated member is outside an ideal external force range; and
display a user interface including:
a graphical representation of the ideal external force range;
a graphical representation of the actual external force relative to the ideal external force range, wherein:
the actual external force is displayed in a first color when the actual external force is within the ideal external force range; and
the actual external force is displayed in a second color, different from the first color, when the actual external force is outside the ideal external force range; and
a graphical representation of a difference between the actual external force and the ideal external force range.

13. The electrosurgical generator of claim 12, wherein the instructions, when executed by the processor, cause the processor to control an output of the electrosurgical generator when it is determined that the actual external force is outside the ideal external force range.

14. The electrosurgical generator of claim 12, wherein the actual operating parameters include the actual external force applied against the end effector assembly and the user interface includes:
the ideal external force range against the end effector assembly; and
the actual external force against the end effector assembly relative to the ideal external force range.

15. The electrosurgical generator of claim 12, wherein the actual operating parameters include the actual external force applied against the elongated member and the user interface includes:
the ideal external force range against the elongated member; and
the actual external force range against the elongated member relative to the ideal external force range.

16. The electrosurgical generator of claim 15, wherein the actual external force applied against the elongated member is an actual torsional force against the elongated member.

17. A user interface for an electrosurgical system, the user interface comprising:
a graphical representation of an ideal angle range between two jaw members of an end effector assembly of an electrosurgical instrument;
a graphical representation of an actual angle between the jaw members of the electrosurgical instrument relative to the ideal angle range, wherein:
the actual angle between the jaw members is displayed in a first color when the actual angle between the jaw members of the electrosurgical instrument is within the ideal angle range;
the actual angle between the jaw members is displayed in a second color, different from the first color, when the actual angle between the jaw members of the electrosurgical instrument is outside the ideal angle range; and
a graphical representation of a difference between the actual angle and the ideal angle when the actual angle between the jaw members of the electrosurgical instrument is outside the ideal angle range;
a graphical representation of an ideal external force range against the end effector assembly;
a graphical representation of the actual external force against the end effector assembly relative to the ideal external force range, wherein:
the actual external force against the end effector assembly is displayed in the first color when the actual external force against the end effector assembly is within the ideal external force range; and
the actual external force against the end effector assembly is displayed in the second color when the actual external force against the end effector assembly is outside the ideal external force range; and
a graphical representation of a difference between the actual external force and the ideal external force range when the actual external force is outside the ideal external force range.

18. The user interface of claim 17, further comprising:
an ideal external torsional force range against an elongated member of the electrosurgical instrument; and an actual external torsional force against the elongated member relative to the ideal external torsional force range, wherein:

the actual external torsional force against the elongated member is displayed in the first color when the actual external torsional force against the elongated member is within the ideal torsional force range; and the actual external torsional force against the elongated member is displayed in the second color when the actual external torsional force against the elongated member is outside the ideal external torsional force range.

\* \* \* \* \*